United States Patent
Hartman

(10) Patent No.: US 10,565,629 B2
(45) Date of Patent: Feb. 18, 2020

(54) COMPUTERIZED VALUATION OF ELECTRONIC EQUIPMENT

(71) Applicant: Richard Lee Hartman, Warren, OH (US)

(72) Inventor: Richard Lee Hartman, Warren, OH (US)

(73) Assignee: CARRIER SERVICES GROUP, INC., Boardman, OH (US)

( * ) Notice: Subject to any disclaimer, the term of this patent is extended or adjusted under 35 U.S.C. 154(b) by 0 days.

(21) Appl. No.: 13/650,103

(22) Filed: Oct. 11, 2012

(65) Prior Publication Data

US 2013/0173434 A1  Jul. 4, 2013

Related U.S. Application Data

(60) Provisional application No. 61/546,053, filed on Oct. 11, 2011.

(51) Int. Cl.
   *G06Q 30/02*  (2012.01)

(52) U.S. Cl.
   CPC ................... *G06Q 30/0283* (2013.01)

(58) Field of Classification Search
   CPC ..................................................... G06Q 10/087
   USPC ....... 705/28, 22, 1.1; 340/572.1; 709/999.01
   See application file for complete search history.

(56) References Cited

U.S. PATENT DOCUMENTS

| | | | | |
|---|---|---|---|---|
| 5,424,944 A | * | 6/1995 | Kelly | G06Q 10/087 700/223 |
| 5,774,876 A | * | 6/1998 | Woolley et al. | 705/28 |
| 6,648,222 B2 | * | 11/2003 | McDonald et al. | 235/380 |
| 7,359,915 B1 | * | 4/2008 | Bush | G06F 11/3409 |
| 7,698,178 B2 | * | 4/2010 | Chu | 705/28 |
| 7,761,331 B2 | * | 7/2010 | Low | G06Q 20/20 186/35 |
| 7,774,268 B2 | * | 8/2010 | Bradley | G06K 17/00 700/236 |
| 7,881,965 B2 | * | 2/2011 | Bowles | G06Q 10/30 705/14.37 |
| 8,219,466 B2 | * | 7/2012 | Gui et al. | 705/28 |
| 8,229,791 B2 | * | 7/2012 | Bradley et al. | 705/22 |
| 8,554,889 B2 | * | 10/2013 | Holtz | H04L 41/12 709/223 |
| 9,524,495 B1 | * | 12/2016 | Hansen | G06Q 10/087 |
| 2002/0143937 A1 | * | 10/2002 | Revashetti | G06Q 10/087 709/224 |
| 2002/0169696 A1 | * | 11/2002 | Zara | G06Q 10/06 705/28 |
| 2002/0188537 A1 | * | 12/2002 | Leeds et al. | 705/35 |
| 2003/0158796 A1 | * | 8/2003 | Balent | 705/28 |
| 2003/0222762 A1 | * | 12/2003 | Beigl | G06K 7/10336 340/5.92 |
| 2004/0024660 A1 | * | 2/2004 | Ganesh | G06Q 10/087 705/28 |

(Continued)

*Primary Examiner* — Vanel Frenel
(74) *Attorney, Agent, or Firm* — Patent Portfolio Builders PLLC

(57) ABSTRACT

Methods and systems for computerized valuation of electronic equipment. The computerized valuation method includes receiving an accurate identification of an asset, receiving a current value of the asset, and outputting the accurate identification of the asset and the current value of the asset to a user device. The receiving of the accurate identification of the asset includes receiving a computerized inventory of the asset.

12 Claims, 3 Drawing Sheets

(56) References Cited

U.S. PATENT DOCUMENTS

| | | | |
|---|---|---|---|
| 2005/0021348 A1* | 1/2005 | Chan et al. .................... 705/1 |
| 2005/0114233 A1* | 5/2005 | Mays .................. G06Q 10/087 |
| | | | 705/28 |
| 2005/0177465 A1* | 8/2005 | Orzell .................. G06Q 10/087 |
| | | | 705/28 |
| 2005/0262993 A1* | 12/2005 | Nurse ...................... F41G 3/142 |
| | | | 89/1.11 |
| 2006/0053075 A1* | 3/2006 | Roth ...................... G06Q 10/06 |
| | | | 705/50 |
| 2006/0089837 A1* | 4/2006 | Adar ...................... G06Q 10/20 |
| | | | 705/309 |
| 2006/0129415 A1* | 6/2006 | Thukral et al. .................... 705/1 |
| 2006/0149574 A1* | 7/2006 | Bradley .................. G06Q 10/04 |
| | | | 705/7.11 |
| 2007/0090951 A1* | 4/2007 | Chan et al. ................. 340/572.1 |
| 2007/0120736 A1* | 5/2007 | MacKenzie et al. .... 342/357.07 |
| 2007/0255781 A1* | 11/2007 | Li et al. ........................ 709/201 |
| 2008/0040244 A1* | 2/2008 | Ricciuti et al. .................. 705/28 |
| 2008/0133427 A1* | 6/2008 | Watson ................ G06Q 40/025 |
| | | | 705/36 R |
| 2008/0215474 A1* | 9/2008 | Graham ........................ 705/37 |
| 2008/0270270 A1* | 10/2008 | Ramachandra ...... G06Q 10/087 |
| | | | 705/28 |
| 2009/0237253 A1* | 9/2009 | Neuwirth .................... 340/572.1 |
| 2010/0179922 A1* | 7/2010 | Brandhorst ................. 705/36 R |
| 2011/0055361 A1* | 3/2011 | Dehaan ...................... G06F 8/61 |
| | | | 709/221 |
| 2011/0145056 A1* | 6/2011 | Sullivan ................. G06Q 30/02 |
| | | | 705/14.41 |
| 2011/0288966 A1* | 11/2011 | Hawkins et al. ................. 705/28 |
| 2012/0158514 A1* | 6/2012 | Aldrey ............... G06Q 30/0269 |
| | | | 705/14.66 |
| 2013/0054492 A1* | 2/2013 | Boudreau ............ G06Q 10/063 |
| | | | 705/400 |
| 2016/0099845 A1* | 4/2016 | Murase .................. H04L 41/12 |
| | | | 715/736 |

* cited by examiner

COMPUTERIZED VALUATION OF ELECTRONIC EQUIPMENT

RELATED APPLICATION

This application is a non-provisional application of prior U.S. Provisional Patent Application Ser. No. 61/546,053, filed Oct. 11, 2011, which is herein incorporated by reference in its entirety.

BACKGROUND

1. Field

Embodiments of the present invention relate generally to computerized methods and systems and more particularly to methods and systems for computerized valuation of electronic equipment.

2. Description of the Related Art

Many organizations (e.g., schools, nonprofits, and businesses) may have a large amount of surplus electronic equipment (e.g., computers, servers, monitors, components therein) that the organizations would like to sell or trade-in when getting new electronic equipment.

Today, to sell or trade-in electronic equipment, organizations may call, e.g., an asset recovery company and offer to sell their electronic equipment. As an example, an organization may communicate a desire to sell 2000 GX280s and invite an asset recovery company to make an offer (GX280 being an exemplary model number of a specific computer). The selling organization may contact multiple asset recovery companies. Alternatively, electronic equipment may be put on a list that may be reviewed by multiple asset recovery companies or other purchasers. For example, a school (through a list) may communicate that it has 2000 GX280s to put on the market. An asset recovery organization may make an offer on the 2000 GX280s.

This approach has many drawbacks. The reality is that neither the selling organization nor the purchasing asset recovery company knows exactly what they are getting as part of the transaction, for example, the GX280s. The selling organization may send the list of electronic equipment out to the asset recovery companies and the purchasing asset recovery company may review the listing and make an offer based on their resell history with the electronic equipment. This approach may be a shot in the dark, because neither party knows what is inside or installed on the electronic equipment. Accordingly, the selling organization and the asset recovery may make a deal believing the electronic equipment to be one thing but later finding out differently. For example, the asset recovery company may agree on a price for the GX280s only to find out, after the electronic equipment is paid for and picked up and returned to the asset recovery facility, that while each piece of electronic equipment is a GX280 externally, each has been upgraded with the addition of a gigabyte of random access memory, an extra hard-drive, and an upgraded video card. The reality is that the computer they paid $40 for is actually worth $60. There was no way for the asset recovery company or the selling organization to capture such data unless one or the other party to the transaction physically walks to, turns on, and inspects every piece of electronic equipment and creates a listing of exactly what is inside the electronic equipment. Logistically this may not happen due to the man-hours involved. Many companies may take the approach of listing what they think they have and requesting an offer based on that belief. The selling organization then sells the electronic equipment for whatever the offer from the asset recovery company is. The following scenario occurs often: an asset recovery company purchases bulk electronic equipment and when the electronic equipment arrives and is actually evaluated, the asset recovery company discovers the electronic equipment just purchased had extra components or software or upgrades making it worth, as an example, $30,000 above the estimated value used as the purchase price. The purchase may have been an auction bid, the asset recovery company bid and won the electronic equipment. In this instance, the asset recovery company did well financially in the transaction relative to the selling organization. There may also be times where a purchaser gets less than what the purchaser expected.

Additionally, there is often software (e.g., Microsoft Windows, Office) that may be included with the electronic equipment but that may not be calculated in the resell value, because it may not be realized that the software may be resold. This may represent a huge secondary market for reselling software or applications that currently remains at least partially un-captured.

In light of the above deficiencies, improved methods and systems are presented.

SUMMARY

An aspect of the present invention provides a computerized valuation method. The computerized valuation method includes receiving an accurate identification of an asset, receiving a current value of the asset, and outputting the accurate identification of the asset and the current value of the asset to a user device. The receiving of the accurate identification of the asset includes receiving a computerized inventory of the asset.

An aspect of the present invention provides a computerized valuation system. The computerized valuation system includes in asset, an application configured to receive an accurate identification of the asset, the application configured to receive a current value of the asset, and a display configured to output the accurate identification of the asset and the current value of the asset to a user. The application configured to receive the accurate identification of the asset comprises a computerized inventory scanner.

The foregoing and other aspects will become apparent from the following detailed description when considered in conjunction with the accompanying drawing figures.

DETAILED DESCRIPTION

Figure 1:
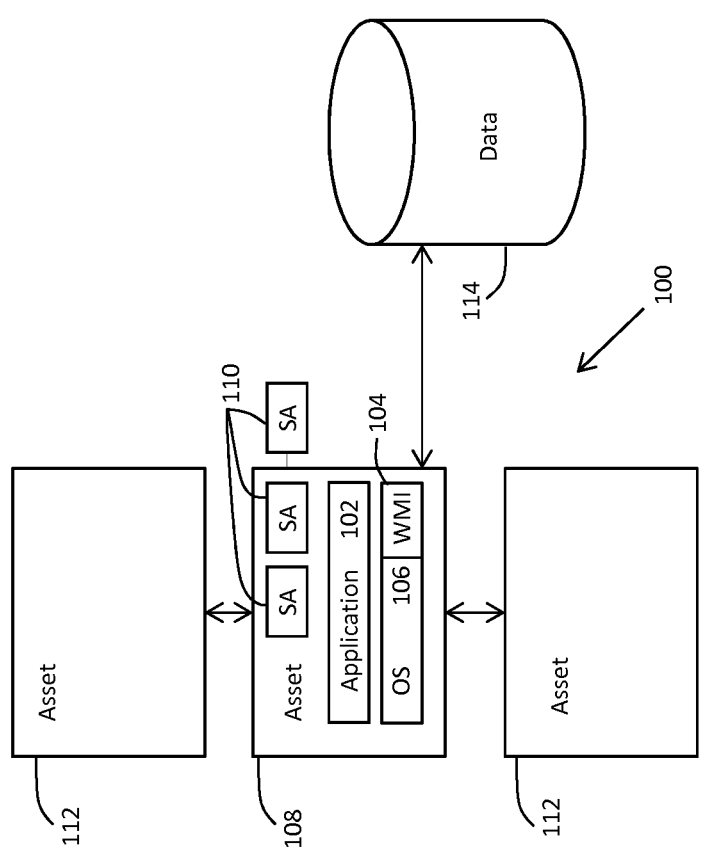
FIG. 1 is a schematic representation of a computerized valuation system according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below to explain the present invention by referring to the figures.

As used in the description of this application, the terms "a", "an" and "the" may refer to one or more than one of an element (e.g., item or act). Similarly, a particular quantity of an element may be described or shown while the actual quantity of the element may differ. The terms "and" and "or" may be used in the conjunctive or disjunctive sense and will generally be understood to be equivalent to "and/or". References to "an" or "one" embodiment are not necessarily all referring to the same embodiment. Elements from an embodiment may be combined with elements of another. No element used in the description of this application should be construed as critical or essential to the invention unless explicitly described as such. Further, when an element is described as "connected," "coupled," "in-communication," or otherwise linked to another element, it may be directly linked to the other element, or intervening elements may be present.

An exemplary embodiment of the present invention is a computerized valuation application residing on an asset (e.g., a computing device). It should be noted that the term "asset" may be used in place of "electronic equipment" throughout this document and that these terms should be interpreted broadly to include many types of hardware and software, for computing devices, telecommunications, and other uses. The computerized valuation application may give a user (e.g., a network administrator) the option to see the current value of the asset. The value may include values of sub-assets within in the asset (e.g., components within the computer, software within the computer) or attached to the asset (e.g., other computing devices on a network). The computerized valuation application may allow the user (e.g., network administrator) to determine actual market value of the asset to assist in a determination of whether to trade-in the asset, upgrade the asset, or donate the asset. Obtaining values, selling, trading-in and disposing of an asset may be as simple as one or a few user operations (e.g., mouse clicks) from within the computerized valuation application. The computerized valuation application may be a standalone computer software application, part of an operating system, a web-based application executable using a common browser, or otherwise programmed. Because the computerized valuation application may "see" assets within and attached to the asset on which an instance of the computerized valuation application may be running, the computerized valuation application may enable a user to search the user's entire network and value other assets connected to the network. For example, a user may search a network and find make and model and configuration information for network printers attached to the network. The computerized valuation application may have different functionality depending on whether installed onto an individual's computing device (personal embodiment) or onto a corporate network (enterprise embodiment). In either an enterprise or on a personal computing device, a user (e.g., a computing device owner or network administrator) may retrieve information for multiple purposes. The personal embodiment or the enterprise embodiment may both be installed by a user installing a client application an asset and the user (e.g., admin or CFO) may be able to track all assets (e.g., by serial number) and current market value for all assets. In an alternative embodiment, the application may be installed in each asset. Being able to track all assets may enable better asset management allowing, e.g., snapshots, end of the year tax values, assets gains and losses. As noted above, the computerized valuation application may be may be web-based. A user may use an Internet browser and upon navigating to a particular website, communication between the user's computing device and servers associated with the website may enable the servers to determine the assets of the user and may communicate the value of the assets to the user.

Exemplary embodiments of the present invention may be used in conjunction with all types of personal computing and telecommunications assets (e.g., personal computing devices, network components, routers, mobile devices, and software) to be sold/reclaimed.

Exemplary embodiments of the present invention may be programmed in C++, PHP or any appropriate software language. In some embodiments, a computing device program may be provided. In other embodiments, a web-based system may be provided. In still other embodiments, an aspect of an operating system may be provided.

FIG. 1 is a schematic representation of a computerized valuation system 100 according to an exemplary embodiment of the present invention. The computerized valuation system 100 according to this exemplary embodiment may be a Microsoft Windows based embodiment installed as a software application 102. The application 102 may interface with Windows Management Instrumentation (WMI) 104, which may be a part of the Microsoft Windows operating system 106. A WMI 104 database may contain asset information about a particular computing device (i.e., asset 108). WMI 104 may show components (i.e., sub-assets 110) that are currently included in or attached to the asset 108. All the hardware that is configured within the computing device and any peripherals attached to the computing device may be inventoried as sub-assets 110 in the WMI. The built in functionality of WMI may inventory all installed software applications as sub-assets. In alternative embodiments, alternative hardware and software asset management inventory elements may be used. In a telecommunications embodiment, a code may be scanned manually or automatically, and imported to a database of assets (e.g., Telcordia) to match an asset.

In an enterprise embodiment, the computerized valuation application may be deployed by a network administrator similar to other current network deployments of computer programs. In a personal embodiment, a general user may install the computerized valuation application on their own asset. An electronic equipment manufacture may push the computerized valuation application to individual assets or to networks directly or via a network administrator. Electronic equipment manufacturers may want to include the computerized valuation application as part of preinstalled software that ships on, e.g., servers, personnel computing devices, or other assets.

Figure 2:
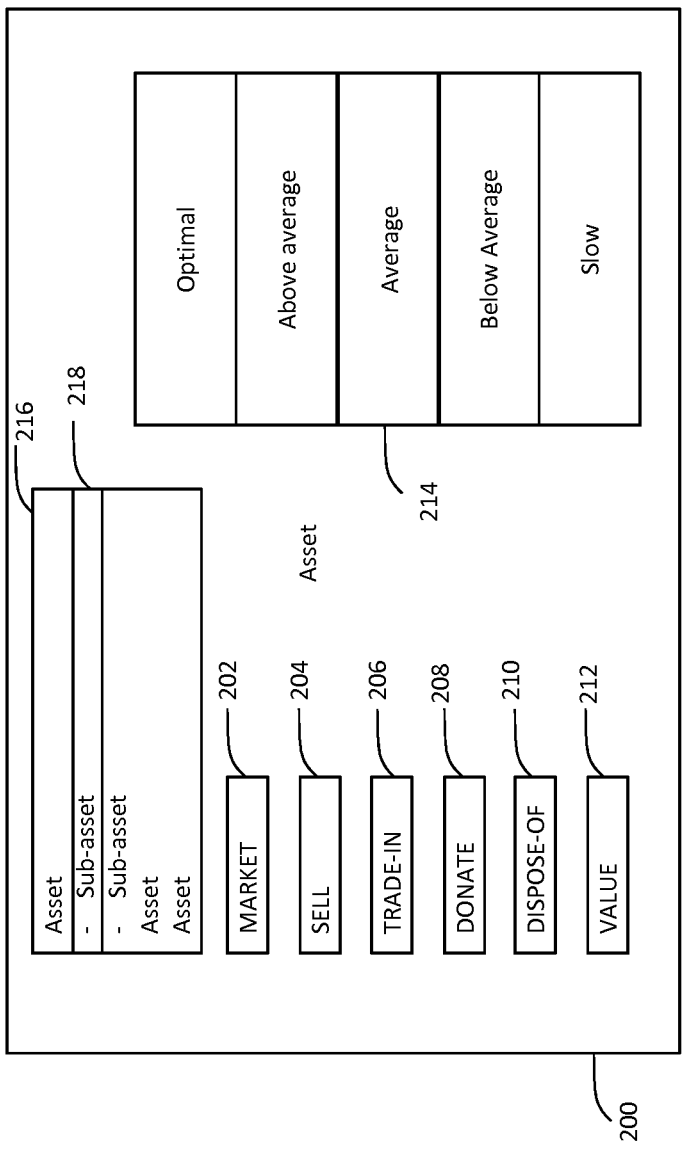
FIG. 2 is a schematic representation of a user interface of a computerized valuation application according to an exemplary embodiment of the present invention.

FIG. 2, discussed in more detail below, is a schematic representation of a user interface 200 of a computerized valuation application according to an exemplary embodiment of the present invention. When it comes time to sell or donate an asset, or a sub-asset such as a computing device part (e.g., a hard-drive) is needed for repairs, a user may launch the user interface 200 and only have to issue one or a few user operations (e.g., click a "sell" button 204, a "donate" button 208, or a "dispose of" button 210) in the computerized valuation application. In this regard, the computerized valuation application may present a new business approach in the way reclamation business is done. Now a customer may contact a reclamation company instead of the reclamation company contacting the customer. To reclaim, e.g., the broken hard drive, a reclamation business may change the hard-drive and may capitalize on whatever other assets the customer may have. Reclamation companies may reclaim, upgrade, trade-in, whenever consumers initiate contact.

As discussed above, there may be two or more versions of the computerized valuation application, including a personal embodiment and an enterprise embodiment. The enterprise embodiment of the computerized valuation application may be best used by, e.g., a financial officer or network administrator. Accordingly, a user may need to have rights to run one or more functions of the computerized valuation application. Reasons for restrictions may include that an organization may not want all users in the organization to have access to asset value information and sale capabilities (i.e., a company may want to avoid employees trying to sell their corporate issued computing device for $1300 at the click of a button).

Turning back to FIG. 1, current value data (e.g., the values of the various assets) may reside in a storage 114 such as a relational database local to the computerized valuation application or may reside in a $3^{rd}$ party data center, where current value data may be built, stored, and monitored. For example, in a web-based embodiment administered by a hardware company, the hardware company may have business reasons for wanting to maintain current value data in-house.

Various business models may be appropriate depending on individual circumstances. For example, in one embodiment, an application could be made available to a subscriber while in an alternative embodiment, the computerized valuation application could be installed permanently as, e.g., firmware of an asset.

A user may use the computerized valuation application to determine only their own asset value or to determine all network asset values. In an embodiment, the current value data may be from an asset recovery company's in-house valuation on all past history and present market history. This information may be made available on a website.

Users may use the computerized valuation application to arrange buyers for surplus or outdated machines and equipment. For example, a company may have a quantity of 2000 of a particular asset. A company user may use the computerized valuation application to solicit a bid. Prospective buyers may be able to access a website listing the 2000 assets and may make an offer. Current bids may be communicated to the user (seller) and the user may also be presented with 30-day history of similar asset values. The current value data which may be accessible via a website may be useful for the user. For every make and model of an asset, the previous value history for 1-30 days may be available, depending on what the user requests.

Asset value predictions may be perfected using algorithms based on trend history and markets and various data models. The computerized valuation application may predict "industry loss value averages". As example: The "industry loss value averages" may be 33% per year on personal computing devices and 20% per year on servers. Such data may be stored with in the storage 114 with the current value data and accessed via a website using the Internet to, e.g., purchasers of the computerized valuation application. The computerized valuation application may have access to current values, e.g., in a manner similar to anti-virus programs getting updates via new definitions. Other updating techniques may be appropriate depending on the particular embodiment. For example, in another exemplary embodiment, the computerized valuation application my receive updated information as needed. For example, a user may select the "market value" button 202; the computerized valuation application may communicate with a website (or other data source) receive current value data (e.g., pricing) and communicate that current value data to the user. A user may select the "sell" button 204 and "trade-in" buttons 206 similarly, and receive bids or proposals on their assets. For example, a commercial company may select the "sell" button 204. A detailed list of the commercial company's assets may be sent to, e.g., the website where a group of buyers may bid on the assets.

The group of buyers may be limited to buyers or asset recovery companies having certain credentials. For example, the group may include only certified reclamation recovery companies. The website may display to the group of buyers transactions, list winners, and return current market values and/or part of the 30 day history if required. An example credential that may be required of a buyer may be a TL9000 certification. By limiting the group of bidders on the assets, the seller may be protected. This may reduce the likelihood equipment, e.g., to be disposed of, is going into landfills or going to going to markets for disposal processing using child labor. Further, certain companies such as law firms may require that the purchasers of their assets subject assets to certain data cleaning processes (e.g., DOD-level hard drive wipes).

Embodiments of the present invention may also involve business aspects. For example, an elite group of bidders can also be a paid group. People could be charged a fee, for example, $10,000 per year, to be a part of the elite group.

Further, a grading system on sellers and buyers may be provided, especially repeat users. They may be given a grade or a percentage score similar to the grading system used by EBay.

Figure 3:
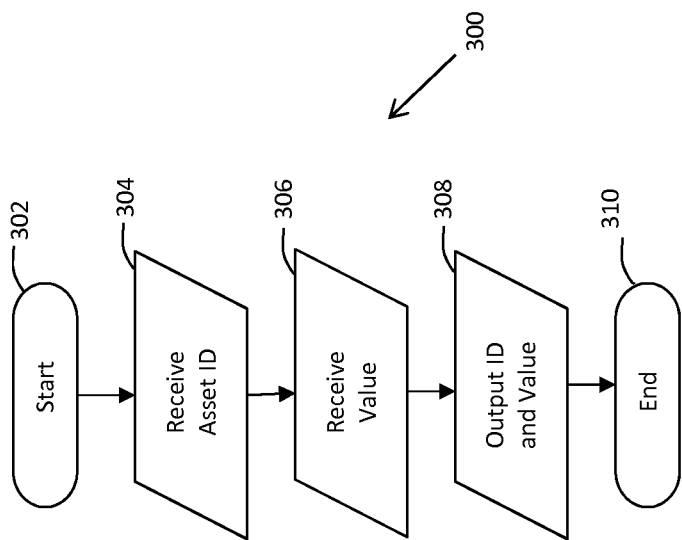
FIG. 3 is a flow chart of a computerized valuation method according to an exemplary embodiment of the president invention.

Turning back to the computerized valuation application 102, a computerized valuation method according to an exemplary embodiment is discussed in conjunction with the computerized valuation application. The computerized valuation method 300 is shown in FIG. 3. In operation 302, the computerized valuation method 300 may start. The computerized valuation application 102 may run on startup or may be started when needed. If a user wants real time currently value data, the computerized valuation application may be so configured. Alternatively, the computerized valuation application may update periodically (e.g., at a certain time of the day). The computerized valuation application may not need to run all of the time to give a live snapshot of real data.

Turning back to FIG. 2, the program interface 200 may include a "market value" button 202, a "sell" button 204, a "trade in" button 206, a "donate" button 208, a "dispose of" button 210, and a "market value" button 212. The program interface 200 may include an asset list 216 and a performance meter 214. Additional features (e.g., controls and displays) may be included.

If a user wants to know the value of an asset running the computerized valuation application, the user may click on the "market value" button 202 and the computerized valuation application may send asset identification information to a website or remote server having access to the storage 114 including current value data. Thus, in operation 304, accurate identification information may be received by the computerized valuation application, e.g., from the WMI 104. A 30 day valuation history of the asset may be obtained and an average and/or the history may be returned to the computerized valuation application. Thus, in operation 306, a current value of the asset may be received by the computerized valuation application 102. In operation 308, the computerized valuation application may return the asset identification and the current value of the asset to be displayed to the user.

The "sell" button 204 may be used to sell assets. For example, to sell a computing device, a user may select the "sell" button 204. For a single user, the computerized valuation application may send identification information about that computing device to, e.g., members of a collective group (discussed above) that buy single units within e.g., an elite certified group. A resale value of the computing device may be sent. The user may be notified of and/or contact a buyer to complete the transaction. For a company, the same transaction may occur or the company may want to sell many assets of the company. The user may have the option to sell everything or only certain assets. For example, a company may have 4000 of a particular asset in their system, but they only want to sell 2000 of those assets. The user may select the assets they want to sell using the asset list 216. For example, in FIG. 2, a sub-asset is shown as selected using a selection indicator 218. Turning back to the 2000 assets of the hypothetical, the user may check the selected 2000 assets for current market value and/or 1-30 day history values. The company may then send a request to sell the equipment to, e.g., members of the Elite group with a known market value. The computerized valuation application may then ask for contact information such as, name and email address of the party initiating the sale. The computerized valuation application may forward the user's contact information to the buying group, which may provide procedures necessary to complete the transaction. Once the company has completed the transaction, assets may be packed up and sent according to procedures. Once the assets are received and verified, the buyer may send payment to the seller.

The "trade in" button 206 may be used to trade-in assets. For example, a single user may want to trade-in their computing device. The computerized valuation application may automatically forward the user to a computing device manufacture's (or retailer's, etc.) website and communicate the identification information about the computing device to the computing device manufacture. Accordingly, the user may buy a new computing device online and get trade in value for their previous computing device. For a commercial entity, the program may automatically go to computing device manufacturer's (, e.g., HP, Dell, ACER, etc.) commercial sales force.

In view of the above, the computerized valuation application may present a new business approach to trading in assets. Current trade in practices may be as follows. A company may call a computing device manufacture and may expect to talk with a representative immediately. A computing device manufacturers such as HP may schedule a visit and a sales representative may visit a customer and obtain a list of assets. The sales representative may then leave the customer site, and may then send the inventory list to an asset reclamation business. The manufacture may evaluate information from the asset reclamation business and then sends information back to the sales representative. The sales representative may then have to schedule another appointment and get back to meet with the customer to work out details. Alternatively, the sales force may use a resale/trade-in value sheet with the current market value of all systems, which is distributed to the sales staff. It may not be current with up-to-date information. Using this slow system can set pricing up to, e.g., 30 days behind actual market value.

In accordance with an embodiment of the present invention, a sales representative can now offer trade in values for used assets in real-time. The computerized valuation application and/or the related website may save a couple days or week off the entire process, with a simple click of a button, the sales representative may have a current value for the asset.

One or more of the controls (e.g., buttons) a user selects (e.g., clicks) may cause asset information to be sent. Asset information may be used in a variety of ways by the sales representative, including in pitching upgrades. For example, the performance meter 214 may show an asset or a group of assets performance. For example, the performance meter 214 may show performance relative to current averages and may display performance as "slow", "below average", "average", "above average", and "optimal".

The "donate" button may present the user with options for donating an asset. Asset matching with entities that need particular assets may be provided.

The "dispose of" button may provide OSHA approved locations for proper destruction or recycling of assets. Whether a person or commercial user, a user may want to make sure that, if the unit is out of date and where there is no remaining value, that the unit is disposed of properly and doesn't end up in a landfill polluting the environment. The computerized valuation application may direct a user to a group that has been certified for the disposal of the assets in question. If the assets are of a large quantity, those assets can also return a residual value to the company (e.g., in the form of payment for raw materials). There may be legal disposal processes, laws that prohibit certain methods of disposal, and the like. Working with appropriate entities, a certified check list may be provided to verify assets are disposed of properly within a network. This may ensure all venders and suppliers follow required laws and proper standards. Proof of proper disposal may be required because companies disposing of equipment may be liable. Use of the computerized valuation application may provide such proof.

The "hardware detail" 212 button may provide system information. When the computerized valuation application opens, it may show the particular asset's information in simple smooth explanation information and may include a question mark on what each asset and/or sub-asset does. The asset list 216 may show all assets. The asset list 216 may show serial numbers, part numbers and manufactures for all assets (e.g., hardware and software) on and attached to the computing device.

In an exemplary embodiment, the computerized valuation application may run as a standalone program on a computing device including, e.g., a storage, a processor, a display, a user input (e.g., a mouse, a keyboard, a touchscreen).

In another exemplary embodiment, a browser may execute code downloaded from a website to perform the same functions.

In an exemplary embodiment, a software program may run on one computing device connected to a server or a series of servers. The server or series of servers may be connected to a number of other computing devices.

In another exemplary embodiment, a computing device program product including a computing device readable medium (e.g., one or more of DVD's, CD's, diskettes, tapes, and/or other suitable medium) provides software instructions for all or part of the computerized valuation application. The computing device program product may be installed from the computing device readable medium by any suitable software installation procedure or after being downloaded from the internet, as is well known in the art.

The functions of embodiments of the invention as described herein may be implemented in one or more hardware devices, such as an integrated circuit (IC), an ASIC (application specific integrated circuit), PLD (programmable logic device), or programmable gate array.

The system may be combined or distributed (as in a distributed computing approach).

Although embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A non-transitory computer-readable medium for generating a computerized valuation by interfacing with Windows Management Instrumentation, comprising executing on a processor of a first asset the operations of:
    the processor of the first asset executing an application interfacing with the Windows Management Instrumentation so as to receive accurate identification data of the first asset including at least one sub-asset installed in the first asset, wherein the first asset is at least one selected from the group of a computing device and a telecommunications device, and wherein the at least one sub-asset installed in the first asset includes at least one selected from the group of hardware components and software components;
    the application interfacing with the Windows Management Instrumentation so as to receive accurate identification data of a second asset including at least one sub-asset installed in the second asset, wherein the second asset is at least one selected from the group of a computing device and a telecommunications device, and wherein the at least one sub-asset installed in the second asset includes at least one selected from the group of hardware components and software components;
    in response to a user input, the application transmitting asset identification information to a current value data server, the asset identification information including the accurate identification data of the first asset and the accurate identification data of the second asset;
    the application receiving, from the current value data server, a current market value of the first asset including the at least one sub-asset installed in the first asset, wherein the current market value of the first asset is determined by the application according to an average of similar historical sale prices data;
    the application receiving, from the current value data server, a current market value of the second asset including the at least one sub-asset installed in the second asset, wherein the current market value of the second asset is determined by the application according to the average of similar historical sale prices data; and
    the application outputting, to a user display device, the accurate identification of the first asset including the at least one sub-asset installed in the first asset and the current market value of the first asset, and outputting, to the user display device, the accurate identification of the second asset including the at least one sub-asset installed in the second asset and the current market value of the second asset,
    wherein the application is configured to solicit a bid from a prospective buyer device, said bid being based on the accurate identification of the first asset including the at least one sub-asset installed in the first asset, and being based on the accurate identification of the second asset including the at least one sub-asset installed in the second asset, and
    wherein the application is configured to output to the user display device, one or more disposal instructions.

2. The non-transitory computer-readable medium of claim 1, wherein the first asset includes a first computing device including a plurality of sub-assets, wherein the plurality of sub-assets installed in the first computing device include both first computing device hardware and first computing device software, and wherein the second asset includes a second computing device including a plurality of sub-assets, wherein the plurality of sub-assets installed in the second computing device include both second computing device hardware and second computing device software.

3. The non-transitory computer-readable medium of claim 1, wherein the second asset includes a telecommunications device.

4. The non-transitory computer-readable medium of claim 3, wherein the receiving of the accurate identification of the second asset comprises receiving an identification code.

5. The non-transitory computer-readable medium of claim 1, wherein the current market value of the first asset and the current market value of the second asset are calculated based on the average of similar historical sale prices data over a predetermined period of time.

6. The non-transitory computer-readable medium of claim 5, wherein the predetermined period of time consists of a previous thirty day period prior to a present time.

7. A system for generating a computerized valuation by interfacing with Windows Management Instrumentation, the system comprising:
    a first asset and a second asset in communication with the first asset, wherein the first asset and the second asset are each at least one selected from the group of a computing device and a telecommunications device;
    a processor of the first asset executing an application configured to interface with the Windows Management Instrumentation so as to receive an accurate identification of the first asset including a plurality of sub-assets installed in the first asset, wherein the plurality of sub-assets installed in the first asset includes at least one selected from the group of hardware components and software components;
    the application configured to receive an accurate identification of the second asset in communication with the first asset, the second asset including a plurality of sub-assets installed in the second asset, wherein the plurality of sub-assets installed in the second asset includes at least one selected from the group of hardware components and software components;
    in response to a user input, the application configured to transmit asset identification information to a current value data server, the asset identification information including the accurate identification of the first asset and the accurate identification of the second asset;
    the application configured to receive, from the current value data server, a current market value of the first asset including the plurality of sub-assets installed in the first asset, wherein the current market value of the first asset is determined by the application according to an average of similar historical sale prices data;
    the application configured to receive, from the current value data server, a current market value of the second asset including the plurality of sub-assets installed in the second asset, wherein the current market value of the second asset is determined by the application according to the average of similar historical sale prices data; and
    a display configured to output the accurate identification of the first asset including the plurality of sub-assets of the first asset and the current market value of the first asset to a user, and configured to output the accurate identification of the second asset including the plurality of sub-assets of the second asset and the current market value of the second asset to the user, wherein the application is configured to solicit a bid from a prospective buyer device, said bid being based on the accurate identification of the first asset including the plurality of sub-assets installed in the first asset, and being based on the accurate identification of the second asset including the plurality of sub-assets installed in the second asset, and wherein the application is configured to output to the display, one or more disposal instructions.

8. The system of claim 7, wherein the first asset is a first computing device, wherein the plurality of sub-assets installed in the first computing device include both first computing device hardware and first computing device software, wherein the second asset is a second computing device, wherein the plurality of sub-assets installed in the second computing device includes both second computing device hardware and second computing device software.

9. The system of claim 7, wherein the second asset includes a telecommunications device.

10. The system of claim 9, wherein a computerized inventory scanner is configured to receive an identification code from the second asset.

11. The system of claim 7, wherein the current market value of the first asset and the current market value of the second asset are calculated based on the average of similar historical sale prices data over a predetermined period of time.

12. The system of claim 11, wherein the predetermined period of time consists of a previous thirty day period prior to a present time.

* * * * *